US012659175B2

(12) United States Patent　　　　(10) Patent No.:　US 12,659,175 B2
Barakat et al.　　　　　　　　　　　(45) Date of Patent:　　Jun. 16, 2026

(54) 3D SPLINTERED PHYSICALLY UNCLONABLE FUNCTION (3D-sPUF)

(71) Applicant: XILINX, INC., San Jose, CA (US)

(72) Inventors: Shadi Barakat, Redwood City, CA (US); Nader Sharifi, San Jose, CA (US)

(73) Assignee: XILINX, INC., San Jose, CA (US)

( * ) Notice: Subject to any disclaimer, the term of this patent is extended or adjusted under 35 U.S.C. 154(b) by 155 days.

(21) Appl. No.: 18/608,528

(22) Filed: Mar. 18, 2024

(65) Prior Publication Data

US 2025/0293895 A1　　Sep. 18, 2025

(51) Int. Cl.
*G06F 21/00*　　　　(2013.01)
*H04L 9/32*　　　　(2006.01)

(52) U.S. Cl.
CPC .................................. *H04L 9/3278* (2013.01)

(58) Field of Classification Search
None
See application file for complete search history.

(56) References Cited

U.S. PATENT DOCUMENTS

| | | | |
|---|---|---|---|
| 10,530,588 B2 * | 1/2020 | Suresh | H04L 9/3278 |
| 10,673,439 B1 * | 6/2020 | Ahmad | H03K 19/17728 |
| 2015/0137340 A1 * | 5/2015 | Buer | H01L 24/49 |
| | | | 257/690 |
| 2017/0132434 A1 * | 5/2017 | Wang | H04L 9/3278 |
| 2017/0288885 A1 * | 10/2017 | Khatib Zadeh | G09C 1/00 |
| 2020/0356700 A1 * | 11/2020 | Lu | G11C 7/12 |
| 2021/0124711 A1 * | 4/2021 | Ansari | G06F 21/575 |
| 2022/0029838 A1 * | 1/2022 | Bear | H04L 9/3278 |
| 2022/0036949 A1 * | 2/2022 | Asnaashari | H04L 9/0866 |
| 2023/0281292 A1 * | 9/2023 | Wu | G06F 21/44 |
| | | | 713/189 |

* cited by examiner

*Primary Examiner* — Maung T Lwin
(74) *Attorney, Agent, or Firm* — Patterson + Sheridan, LLP

(57)　　　　　　ABSTRACT

Embodiments herein describe a 3D splintered physical unclonable function (3D-sPUF). In an example, an integrated circuit (IC) device includes multiple dies in a stacked configuration, and a PUF circuit generates a set of bits that is unique to the PUF circuit based on physical variations of elements of the PUF circuit, where the PUF circuit is distributed amongst two or more of the dies.

20 Claims, 13 Drawing Sheets

300

500

600

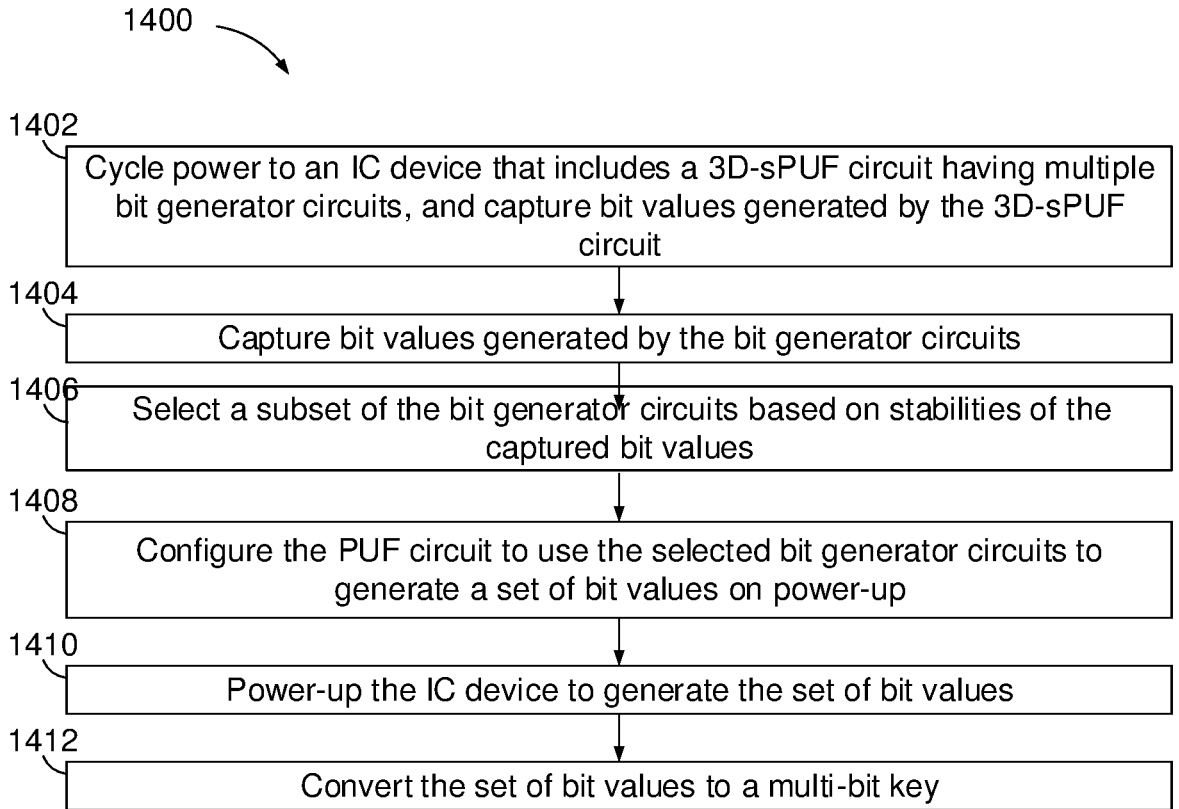

1400

1402
Cycle power to an IC device that includes a 3D-sPUF circuit having multiple bit generator circuits, and capture bit values generated by the 3D-sPUF circuit 1404
Capture bit values generated by the bit generator circuits 1406
Select a subset of the bit generator circuits based on stabilities of the captured bit values 1408
Configure the PUF circuit to use the selected bit generator circuits to generate a set of bit values on power-up 1410
Power-up the IC device to generate the set of bit values 1412
Convert the set of bit values to a multi-bit key

FIG. 14

3D SPLINTERED PHYSICALLY UNCLONABLE FUNCTION (3D-sPUF)

TECHNICAL FIELD

Examples of the present disclosure generally relate to integrated circuits, including a 3D splintered physical unclonable function (3D-sPUF).

BACKGROUND

A physical unclonable function (PUF) circuit generates a signature (e.g., a sequence of bits) that is unique to the PUF circuit, based on fabrication-based physical variations of components of the PUF circuit. The physical variations serve as sources of entropy/randomness that are unique to the PUF circuit. PUF circuits are used in security applications, such as authentication of devices in which the PUF circuits are embedded.

SUMMARY

Techniques for a 3D splintered physical unclonable function (3D-sPUF) are described. One example is an integrated circuit (IC) device that includes a multiple dies in a stacked configuration, and a PUF circuit that generates a set of bits that is unique to the PUF circuit based on physical variations of elements of the PUF circuit, where the PUF circuit is distributed amongst two or more of the dies.

Another example is a system that includes an IC device having multiple dies in a stacked configuration, a PUF circuit that generates a set of bits that is unique to the PUF circuit based on physical variations of elements of the PUF circuit, where the PUF circuit is distributed amongst two or more of the dies, and digital processing circuitry configured to convert the set of bits to a multi-bit key.

Another example is an apparatus that includes a processor and a memory comprising instructions to cause the processor to cycle power to an IC device that includes multiple dies in a stacked configuration, and a PUF circuit that includes multiple bit generator circuits that generate respective bit values based on physical variations of elements of the PUF circuit, where the PUF circuit is distributed amongst two or more of the dies. The instructions further cause the processor to capture the bit values generated by the bit generator circuits, select a subset of the bit generator circuits based on stabilities of the captured bit values, and configure the PUF circuit to use the selected subset of bit generator circuits to generate a set of bit values when power is applied to the IC device.

BRIEF DESCRIPTION OF DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

FIG. 14 illustrates a method of configuring and using a 3D-sPUF circuit, according to an embodiment.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
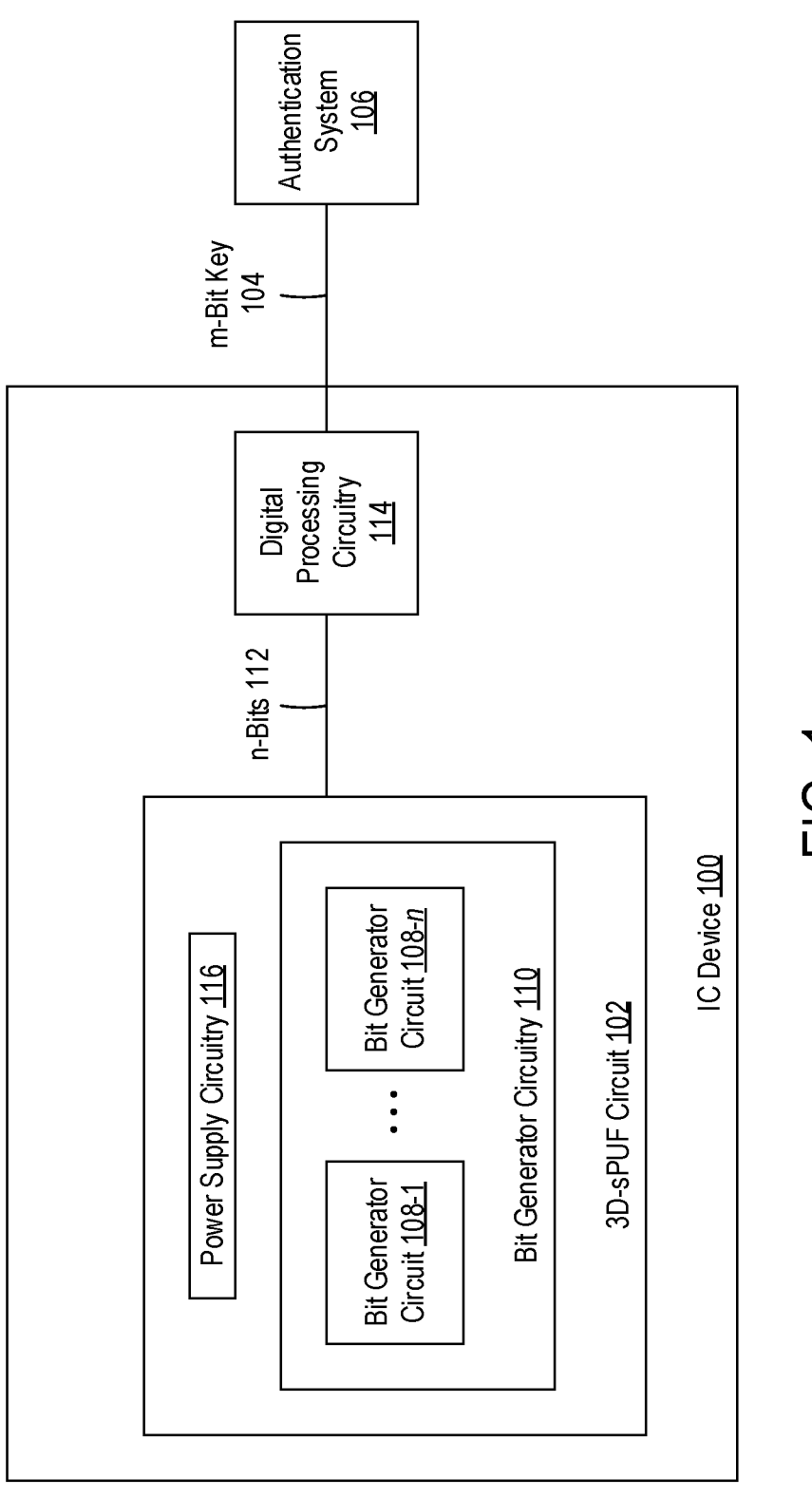
FIG. 1 is a block diagram of a 3-dimensional splintered physical unclonable function (3D-sPUF) circuit, distributed amongst multiple dies of an integrated circuit (IC) device, according to an embodiment.

Various features are described hereinafter with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the features or as a limitation on the scope of the claims. In addition, an illustrated example need not have all the aspects or advantages shown. An aspect or an advantage described in conjunction with a particular example is not necessarily limited to that example and can be practiced in any other examples even if not so illustrated, or if not so explicitly described.

Embodiments herein describe a 3D splintered physical unclonable function (3D-sPUF).

PUF circuits use random variations, at a transistor level, to acquire unique properties and signatures of the PUF circuits. The random variations may be exploited by system-on-chip (SoC) based PUF system to generate a unique signature of the SOC.

A 3D-sPUF circuit is a splintered (i.e., separated or segmented) PUF circuit that is distributed amongst multiple dies of an IC device (e.g., a 3-dimensional (3D) stack of dies). A 3D-sPUF circuit enables the generation of random variation thru the stack. In other words, a 3D-sPUF circuit exploits sources of entropy/randomness across the 3D stack.

A 3D-sPUF function circuit may include an oscillator array, contention-based circuitry (i.e., analogous to memory cells), and/or other circuitry. The 3D-sPUF function may serve as a primary source of entropy/randomness. Additional sources of entropy/randomness may include, without limitation, power supply circuitry, inter-die connections, and/or intra-die connections. The additional sources of entropy/randomness may also be splintered and distributed across the 3D stack.

3D-sPUF circuits may be designed with complimentary metal-oxide semiconductor (CMOS) based PUF architectures.

3D-sPUF circuits may be designed with cost-efficient, modular/scalable architectures that support heterogeneous integration in 2D and 3D based architectures. Modular architectures enable implementation of the 3D-sPUF function in an optimum process node allowing design re-use across multiple generations of products. As an example, an oscillator array design may be reused in a 3D stack, even if the design is based on a fabrication process that differs from a fabrication process of a compute die of the 3D stack. The oscillator array design may be based on an older fabrication process (e.g., a 7 nanometer (nm) fabrication process), and the compute die may be based on a newer fabrication process (e.g., a 5 nm or 2 nm fabrication process). In this example, the oscillator array design may be placed in a legacy die (of a 3D stack) that is based on the older fabrication process, rather than the compute die. A bias network may be tailored/re-designed across the 3D stack to provide headroom and AC/DC electrical specification of the oscillator array.

Modular architectures may enhance security by corrupting the 3D-sPUF function in the event of tampering (e.g. delayering a top die or base die of the stack). Corruption is achieved by breaking functionality and/or breaking parametric performance (e.g. changing analog bias points or life time degradation curve).

A 3D-sPUF circuit may exploit passive sources of entropy/randomness across a 3D stack, such as such as resistors of bias network circuits, intra-die connections, and/or inter-die connections. For example, through-silicon vias (TSVs) that connect active circuits of the 3D-sPUF function may serve as additional sources of entropy/randomness.

A 3D-sPUF circuit may include switches within a transistor network, which may provide additional security (e.g., with respect to delayering). As an example, a switch may be disposed within an intermediate die of a 3D stack, and switch enable logic may be disposed within a top die and/or a base die of the 3D stack. If the top die or the base die is delayered, the switch enable logic will be inoperable, which will disable functionality of the 3D-sPUFF circuit.

A 3D-sPUF circuit may include a passive network and/or a bias network. The passive network and/or bias network may provide reliability and/or reduce transistor aging. The passive network and/or bias network may be useful to reduce a voltage that is available in a top die, to a desired voltage of the 3D-sPUF function, rather than adding an additional voltage supply to the top tie, which may reduce costs. As an example, a top die may include a 1.8 volt (V) supply, and the 3D-sPUF function may be designed for 0.75V. In this example, a bias network may include a resistor or resistor network to achieve a droop needed for safe operation of the 3D-sPUF function at 0.75V.

A bias network may be distributed across the 3D stack, which may enable heterogeneous mixing of circuits. As an example, a top die of the 3D stack may be a silicon-germanium (SiGe) die for optical connectivity. In this example, a portion of the bias network may be provided in SiGe, and a remaining portion of the bias network may be provided in a CMOS process.

A 3D-sPUF circuit may include P and/or N current bias networks to embed sources of entropy/randomness within a desired die/dies of a stack. The bias networks may be extended to a 3D stacked regulator. The bias network may suppress noise, which might otherwise serve as an unwanted source of entropy/randomness.

A 3D-sPUF circuit may leverage random behavior of intrinsic process mismatches between current sources. For example, oscillator array clusters may have different current sources mirrored from the same bias diode transistor. Mismatch between the diode connect transistor and the current source tail device across clusters may serve as additional sources of entropy/randomness.

FIG. 1 is a block diagram of a 3-dimensional splintered physical unclonable function (3D-sPUF) circuit 102, distributed amongst multiple dies of an integrated circuit (IC) device 100, according to an embodiment. The dies may be vertically stacked relative to one another.

3D-sPUF circuit 102 includes bit generator circuitry 110, which may include bit generator circuits 108-1 through 108-$n$ (collectively, bit generator circuits 108), that generate respective bit values based on physical variations of elements of bit generator circuits 108, such that a set of n-bits 112 is unique to 3D-sPUF circuit 102. The set of n-bits 112 serve as a unique digital fingerprint of 3D-sPUF circuit 102.

The physical variations serve as sources of entropy/randomness, which may arise during fabrication of the dies. The sources of entropy/randomness may include analog elements/features of 3D-sPUF circuit 102. The entropy/randomness may be exploited when power is initially applied to bit generator circuits 108.

Bit generator circuits 108 may include, for example and without limitation, respective pairs of oscillators (e.g., ring oscillators), such as described below with reference to FIGS. 3-7. Alternatively, or additionally, bit generator circuits 108 include contention-based circuitry (i.e., analogous to memory cells), such as described further below with reference to FIGS. 8 and 9. Bit generator circuits 108 are not, however, limited to the foregoing examples.

3D-sPUF circuit 102 may further include power supply circuitry 116 that provides and/or regulates power to bit generator circuits 108. Power supply circuitry 116 may include a passive network (e.g., resistors), a bias network, and/or a regulator. Power supply circuitry 116 may serve as an additional source of entropy for the n-bits 112. Power supply circuitry 116 may include a single power supply circuit that provides power to all bit generator circuits 108. Alternatively, power supply circuitry 116 may include multiple power supply circuits for respective bit generator circuits 108.

Bit generator circuits 108 and/or power supply circuitry 116 may be splintered (e.g., separated or segmented) and distributed over multiple dies of IC device 100, in a variety of configurations. Splintering and distributing bit generator circuits 108 and/or power supply circuitry 116 over multiple dies of IC device 100 may provide additional sources of entropy and/or may provide security benefits. In an example, bit generator circuits 108 are placed on one of multiple dies of IC device 100, and power supply circuitry 116 is splintered and distributed over multiple dies of IC device 100. In another example, bit generator circuits 108 are distributed amongst multiple dies (e.g., without splintering individual bit generator circuits 108). In another example, individual bit generator circuits 108 are splintered and distributed amongst multiple dies.

In an embodiment, at least a portion of 3D-sPUF circuit 102 is placed in an uppermost die of IC device 100 and/or a base (i.e., bottom) die of IC device 100. Placing a portion of 3D-sPUF circuit 102 in the uppermost die and/or in the base die may be useful for disabling 3D-sPUF circuit 102 in the event that IC device 100 is de-layered (e.g., for unauthorized/malicious reverse engineering purposes). Other examples are provided further below with reference to FIGS. 10, 11, and 12.

IC device 100 may further include digital processing circuitry 114, which may filter and/or post-process the set of n-bits 112. Digital processing circuitry 114 may convert the set of n-bits 112 to an m-bit code or key 104, where m and n may differ from one another or may be equal to one another. Digital processing circuitry 114 may, for example and without limitation, scramble, hash, and/or encode the n-bits 112 to provide m-bit key 104. Key 104 (and/or the n-bits 112) may be used or applied in one or more of a variety of applications. As an example, IC device 100 may provide key 104 to an authentication system 106 for authentication of IC device 100. In another example, IC device 100 and/or another device may use key 104 as an encryption and/or decryption key. Key 104 is not, however, limited to the aforementioned applications.

Figure 2:
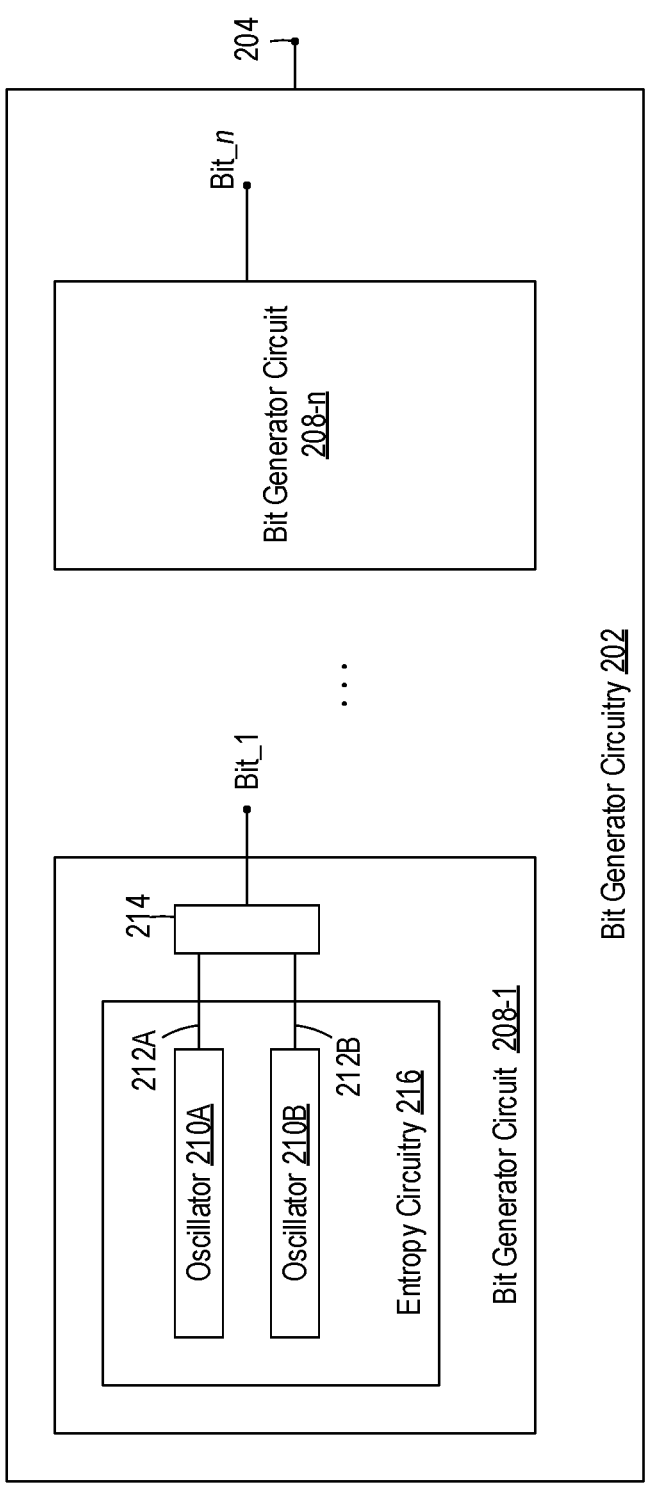
FIG. 2 is a block diagram of bit generator circuitry that includes oscillator-based bit generator circuits, according to an embodiment.

FIG. 2 is a block diagram of bit generator circuitry 202 that includes oscillator-based bit generator circuits 208-1 through 208-n (collectively, bit generator circuits 208), according to an embodiment. In the example of FIG. 2, bit generator circuit 208-1 includes a pair of oscillators 210A and 210B that generate respective periodic signals, referred to herein as clocks 212A and 212B. Oscillators 210A and 210B may be designed identical to one another. Due to physical variations, however, one of oscillators 210A and 210B runs faster than the other. Oscillators 210A and 210B may be collectively referred to as entropy circuitry 216.

Bit generator circuit 208-1 further includes decision circuitry 214 that sets an output, Bit_1, to a logic state 1 if clock 212A is faster than clock 212B, and sets Bit_1 to a logic state 0 if clock 212A is slower than clock 212B. Oscillators 210A and 210B may include ring oscillators, such as described below. Remaining ones of bit generator circuits 208 may be similar or identical to bit generator circuit 208-1.

Figure 3:
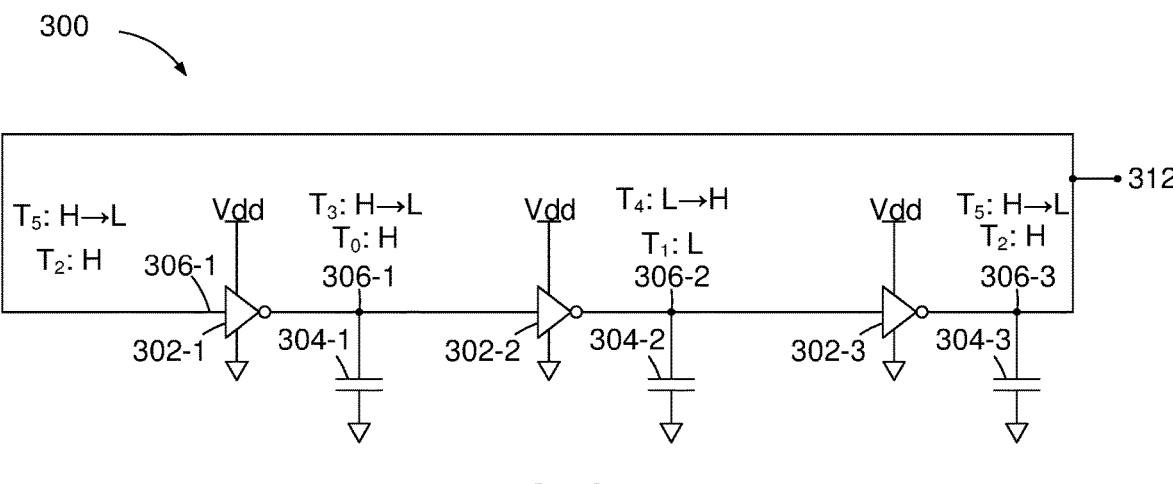
FIG. 3 is a logic diagram of a ring oscillator, according to an embodiment.

FIG. 3 is a logic diagram of a ring oscillator 300, according to an embodiment. Ring oscillator 300 includes an odd number of inverting delay cells 302-1, 302-2, and 303-3 (collectively, inverting delay cells 302), and corresponding capacitors 304-1, 304-2, and 304-3 coupled to respective nodes 306-1, 306-2, and 306-3. Ring oscillator 300 generates a periodic signal/clock 312 having a frequency that is based in part of physical variations of inverting delay cells 302. Ring oscillator 300 is described below with reference to FIG. 4.

Figure 4:
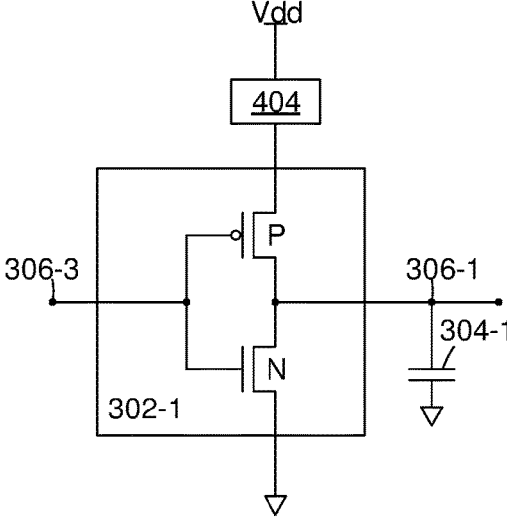
FIG. 4 is a schematic of inverting delay cell of the ring oscillator, according to an embodiment.

FIG. 4 is a schematic of inverting delay cell 302-1, according to an embodiment. In the example of FIG. 4, inverting delay cell 302-1 includes series-connected transistors, denoted here as P and N. Inverting delay cells 302-2 and 302-3 may be designed identical to inverting delay cell 302-1.

Before a voltage Vdd is applied to ring oscillator 300, nodes 306-1, 306-2, and 306-3 are floating (i.e., not pulled up to Vdd or pulled down to ground). When voltage Vdd is initially applied to inverting delay cells 302, inverting delay cells 302 attempt to pull respective nodes 306 up to Vdd through the respective P transistors, or to ground through the respective N transistors, depending on relative strengths of the respective P and N transistors.

In an example, at time $T_0$ following power-up, the P transistor of inverting delay cell 302-1 pulls node 306-1 to Vdd. As node 306-1 is pulled up to Vdd, capacitor 304-1 charges. As capacitor 304-1 charges, the P transistor of inverting delay cell 302-2 turns off and the N transistor of inverting delay cell 302-2 turns on, which pulls node 306-2 to ground and discharges capacitor 304-2, at time $T_1$. As capacitor 304-2 discharges, the P transistor of inverting delay cell 302-3 turns on and the N transistor of inverting delay cell 302-3 turns off, which pulls node 306-3 up to Vdd and charges capacitor 304-3, at time $T_2$. As capacitor 304-3 charges, the P transistor of inverting delay cell 302-1 turns off and the N transistor of inverting delay cell 301-1 turns on, which pulls node 306-1 to ground and discharges capacitor 304-1, at time $T_3$ (i.e., node 306-1 switches from Vdd to ground. Thereafter, node 306-2 switches from ground to Vdd at time $T_4$, and node 306-2 switches from Vdd to ground at time $T_5$. In this way, ring oscillator 300 generates periodic signal/clock 312. A frequency of periodic signal/clock 312 is based on how fast inverting delay cells 302 charge respective capacitors 304, which depends on how much current is provided to inverting delay cells 302 (e.g., by a power supply 404 in FIG. 4).

Frequencies of multiple instances of ring oscillator 300 may differ from one another due to physical variations amongst elements of the ring oscillators. The differing frequencies serve as a source of entropy. Comparing frequencies of oscillator pairs, as described further above, provides a consistent bit sequence that is unique to 3D-sPUF circuit 102.

A ring oscillator may be splintered and distributed amongst multiple dies of an IC device, examples of which are provided below. Ring oscillator splintering and distribution is not, however, limited to the following examples.

Figure 5:
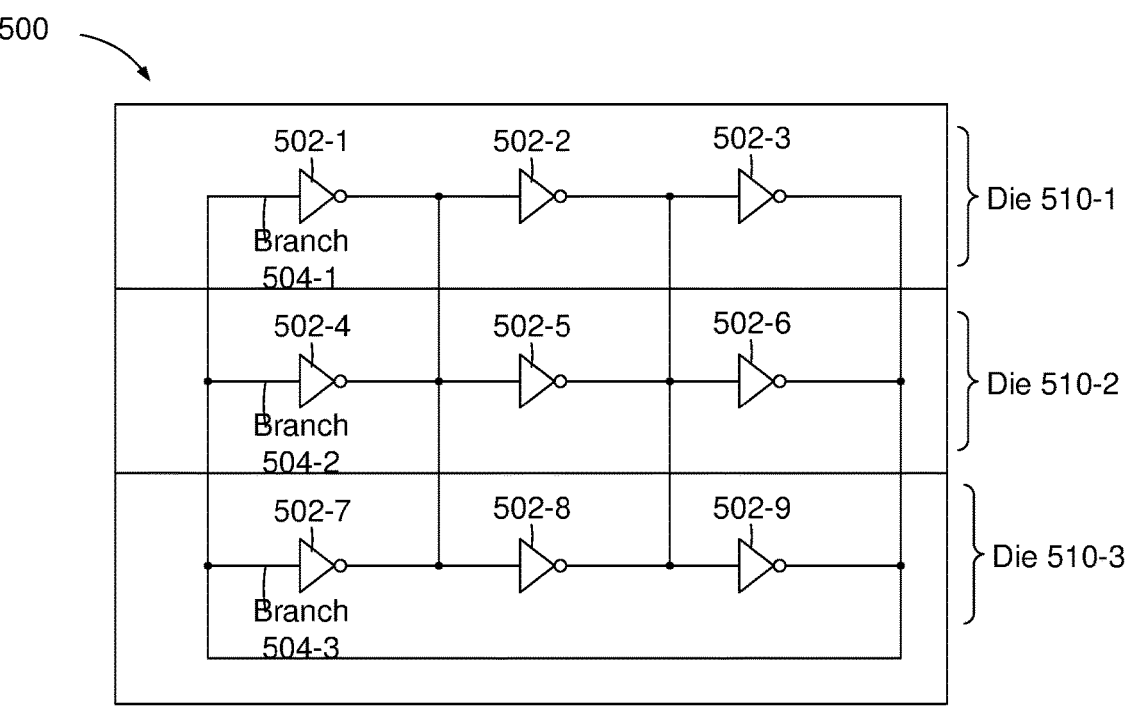
FIG. 5 is a logic diagram of a splintered 3D ring-oscillator, distributed amongst multiple dies of an IC device, according to an embodiment.

FIG. 5 is a logic diagram of a 3D ring-oscillator 500, splintered and distributed amongst multiple dies of an IC device, according to an embodiment. In the example of FIG. 5, 3D ring-oscillator 500 includes inverting delay cells 502-1 through 502-9, which are distributed amongst parallel branches 504-1, 504-2, and 504-3 of 3D ring-oscillator 500. Branches 504-1, 504-2, and 504-3 may be placed on respective dies 510-1, 510-2, and 510-3 of the IC device.

Figure 6:
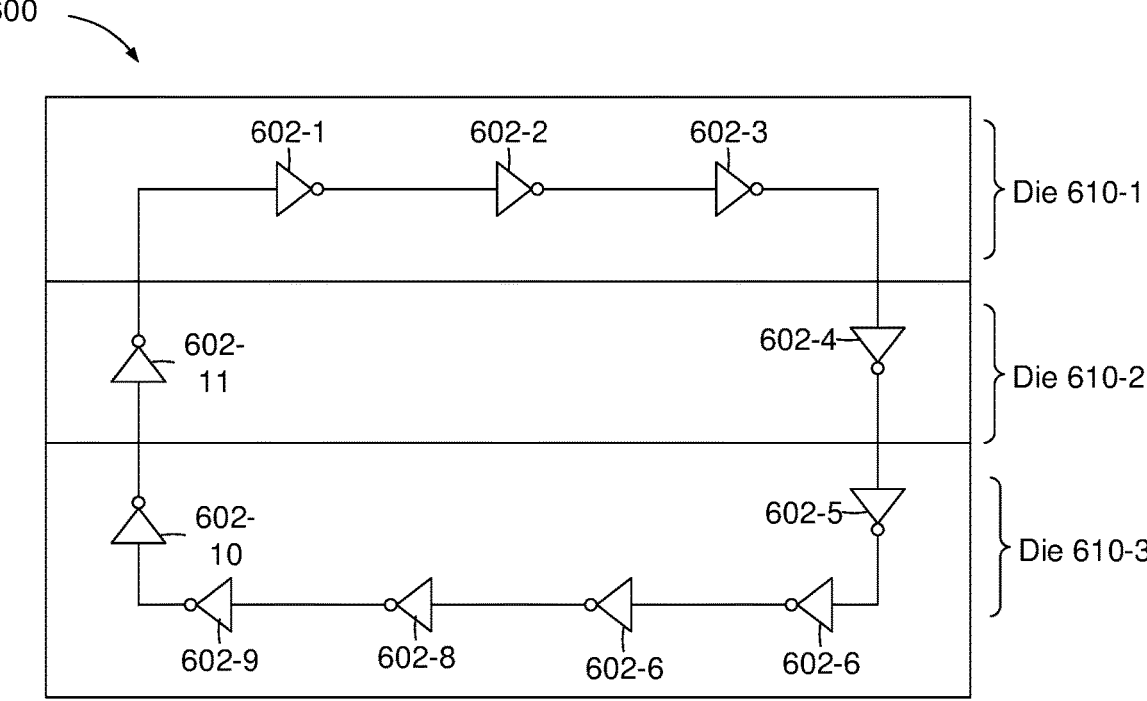
FIG. 6 is a logic diagram of another splintered 3D ring-oscillator, distributed amongst multiple dies of an IC device, according to an embodiment.

FIG. 6 is a logic diagram of a 3D ring-oscillator 600, splintered and distributed amongst multiple dies of an IC device, according to an embodiment. In the example of FIG. 6, 3D ring-oscillator 600 includes series-connected inverting delay cells 602-1 through 602-11, distributed amongst dies 604-1, 604-2, and 604-3 of the IC device.

Figure 7:
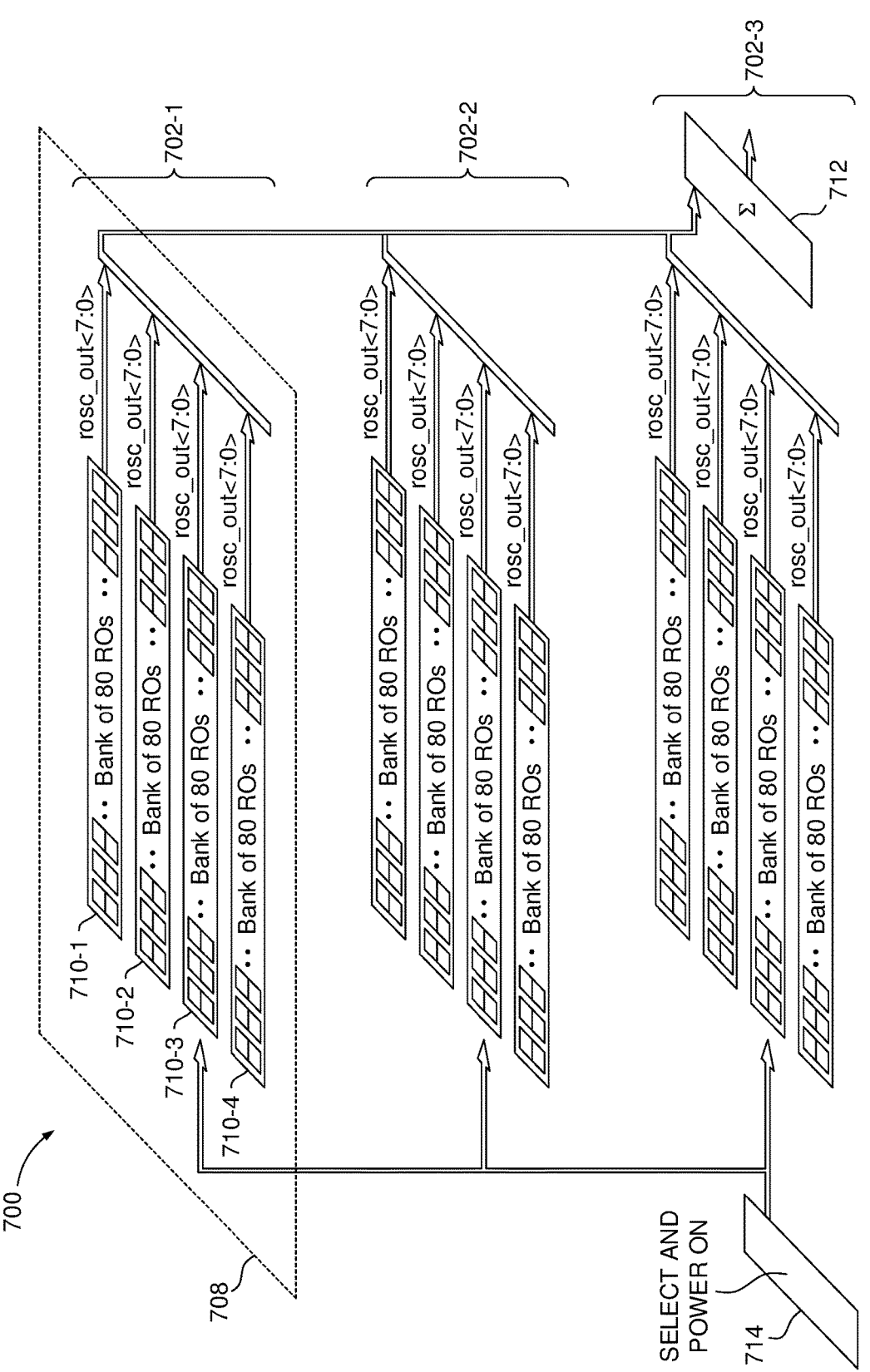
FIG. 7 illustrates an IC device that includes a 3D-sPUF circuit having multiple 2-dimensional (2D) arrays of ring oscillators placed in respective dies of the IC device, according to an embodiment.

FIG. 7 illustrates an IC device 700 that includes a 3D-sPUF circuit having multiple 2-dimensional (2D) arrays of ring oscillators placed in respective dies 702-1, 702-2, and 702-3 of IC device 700, according to an embodiment. In the example of FIG. 7, die 702-1 includes a 2D array 708 of ring oscillators, illustrated here as banks 710-1, 710-2, 710-3, and 710-4 of ring oscillators. 2D array 708 further includes frequency compare circuitry that compares frequencies of pairs of oscillators of 2D array 708. Dies 702-2 and 702-3 include similar 2D arrays of ring oscillators and corresponding compare circuitry. In the example of FIG. 7, frequency comparisons are performed horizontally (i.e., within a die), between pairs of ring oscillators. 2D arrays of ring oscillators having per-die based frequency comparison circuitry may be useful to simplify voltage bias equalization across the respective 2D arrays.

In an embodiment, a subset of ring oscillators of each 2D array is selected for constructing an n-bit code. Unused/unselected banks of oscillators may be disabled, which may conserve power and or reduce ageing of transistors of the disabled banks. The subset of ring oscillators may be selected based on one or more of a variety of factors. For example, and without limitation, a pair of oscillators of a 2D array may be selected if the frequency difference between the pair of oscillators meets a threshold (e.g., to insure that the bit generated from the pair is always the same).

In an example, all blocks of all arrays may be powered up, and outputs of all arrays may be provided to centralized selection circuitry 712 (e.g., in one of the dies) for selection of the subset of bit generators (e.g., ring oscillators). This may be useful to reduce a number of inter-die control signals. Alternatively, selection may be performed within the respective dies based on control signals from control circuitry 714, which may reduce a number of inter-die connections (i.e., TSVs) needed to provide outputs of all banks to centralized selection circuitry 712.

Figure 8:
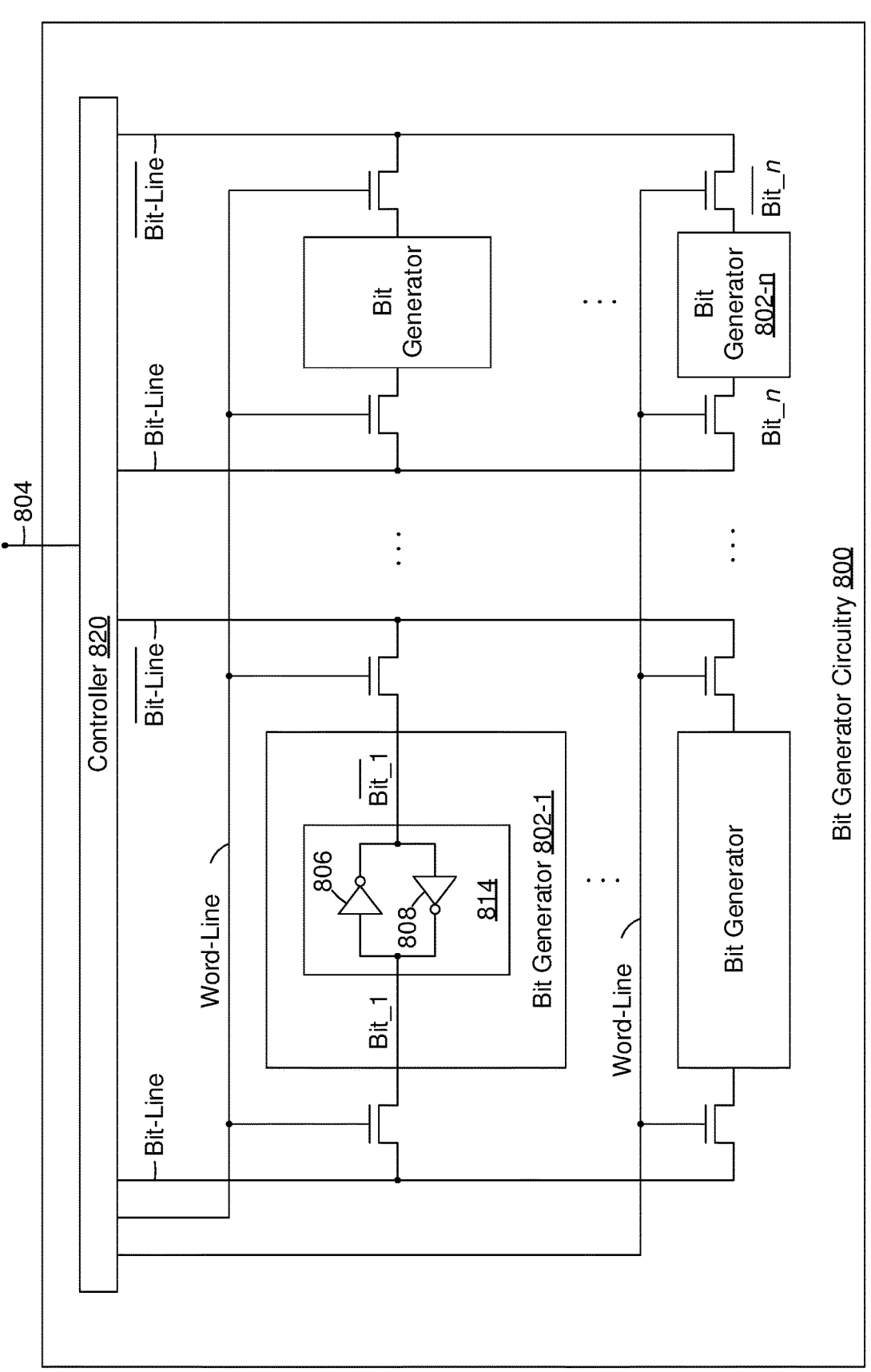
FIG. 8 is a schematic diagram of bit generator circuitry that includes an array of addressable contention-based bit generation circuits, according to an embodiment.

FIG. 8 is a schematic diagram of bit generator circuitry 800 that includes an array of addressable contention-based bit generation circuits 802-1 through 802-n (collectively, bit generator circuits 802), according to an embodiment. As described below, bit generator circuits 802 generate respective bits based in part on physical variations amongst elements of bit generator circuits 208. In the example of FIG. 8, bit generator circuit 808-1 includes a contention-based entropy circuit 814, illustrated here as cross-coupled inverters 806 and 808, which may be analogous to a random-access memory cell.

Figure 9:
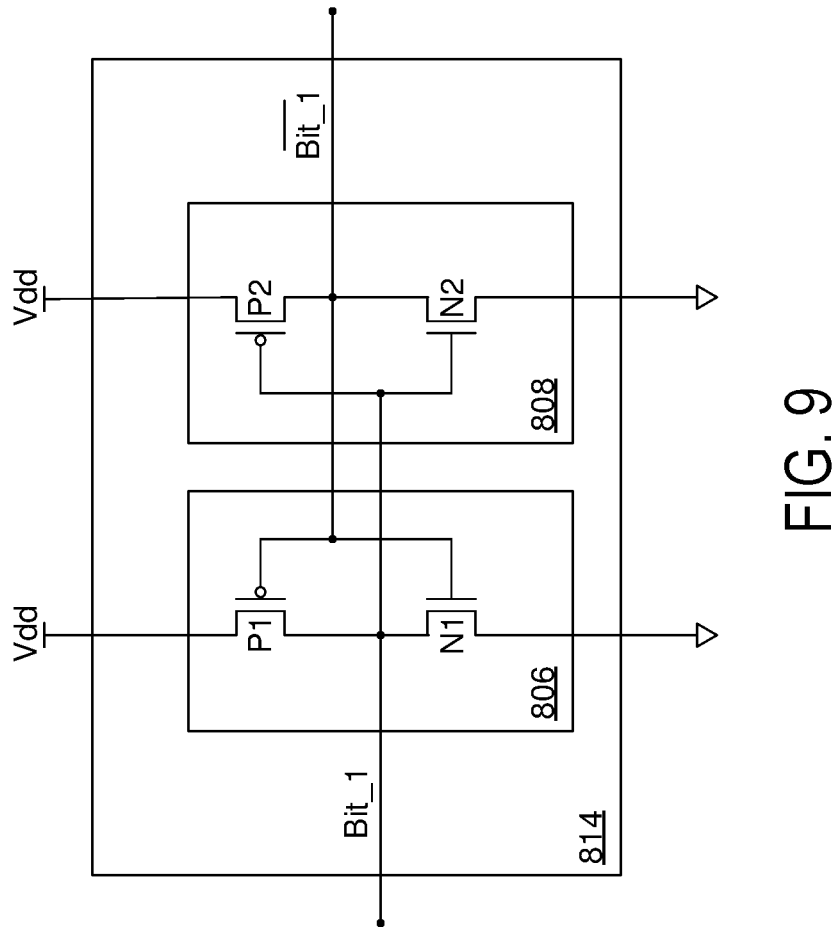
FIG. 9 is a schematic of a contention-based entropy circuit, according to an embodiment.

FIG. 9 is a schematic of contention-based entropy circuit 814, according to an embodiment. In the example of FIG. 9, inverter 806 includes series-connected transistors P1 and N1, and inverter 808 includes series-connected transistors P2 and N2. Transistors P1 and P2 may be designed identical to one another, and transistors N1 and N2 may be designed identical to one another. Due to physical variations, transistors P1 and P2 may differ from one another, and transistors N1 and N2 may differ from one another (e.g., with respect to voltage thresholds).

In a memory application, opposing logic states are written to nodes Bit_1 and $\overline{\text{Bit\_1}}$, and the logic states are maintained/enforced by cross-coupled inverters 806 and 808. Whereas in a 3D-sPUF application, when Vdd is applied, contention-based entropy circuit 814 goes into a metastable (i.e., indeterminable) state as transistors P1 and N1 contend with one another, transistors P2 and N2 contend with one another, and inverters 806 and 808 contend with one another. Depending on voltage thresholds of transistors P1, P2, N1, and N2, contention-based entropy circuit 814 will settle to one of two states (i.e., Bit_1 will be pulled up to Vdd or pulled to ground). Depending on the voltage thresholds of transistors P1, P2, N1, and N2, contention-based entropy circuit 814 may tend to always settle into the same state after power up, or may have a random probability of settling into one of the two states after power up. If contention-based entropy circuit 814 tends to always settle into the same state after power up, contention-based entropy circuit 814 may be useful as a bit generator circuit.

In an embodiment, a 3D-sPUF circuit includes numerous contention-based circuits (e.g., more than n), and a subset of n of the contention-based circuits is selected as bit generator circuits based on respective tendencies to settle into the same state after power up. As an example, and without limitation, an IC device may include programmable circuitry to arrange/connect selected contention-based circuits as an array of addressable cells, such as illustrated in FIG. 8. A controller 820 may read contents/states of bit generator circuits 802 after power up based on word lines and bit lines, analogous to a memory read operation. Unlike a memory read operation, the contents/states of bit generator circuits 802 are based on entropy rather than preceding write operations. In other words, bit generator circuits 802 are powered up and read, without a preceding write operation.

In an example, 3D-sPUF circuit 800 is splintered and distributed amongst multiple die of the IC device. In another example, 3D-sPUF circuit 800 is placed in a single die of an IC device, and a power supply is splintered and distributed amongst multiple die of the IC device. Additional example 3D-sPUF circuits are described below.

Figure 10:
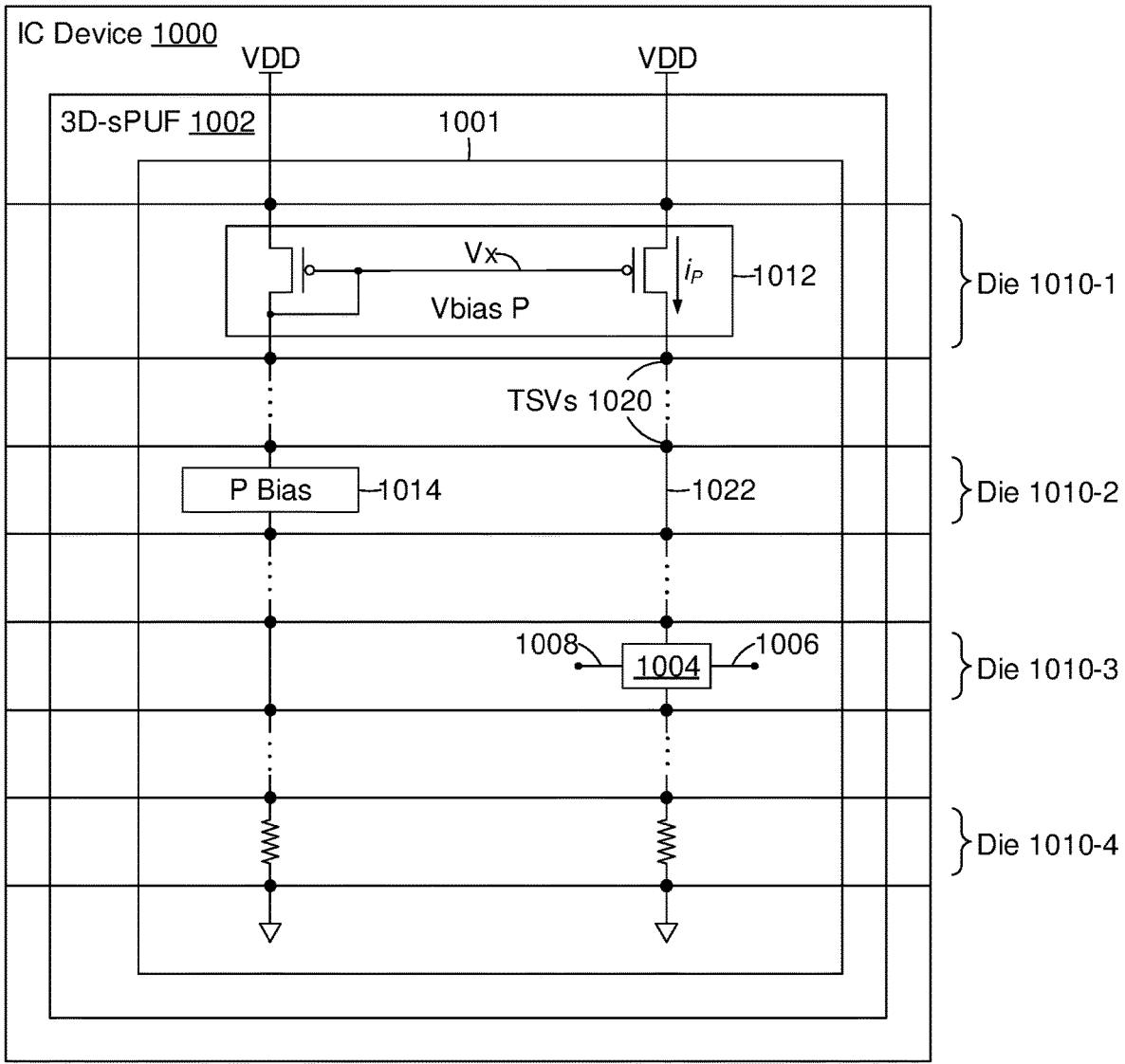
FIG. 10 is a schematic diagram of circuitry of a 3D-sPUF circuit, distributed amongst multiple dies of an IC device, according to an embodiment.

FIG. 10 is a schematic diagram of circuitry 1001 of a 3D-sPUF circuit 1002, distributed amongst multiple dies of an IC device 1000, according to an embodiment. In the example of FIG. 10, circuitry 1001 includes entropy circuitry 1004 placed on a die 1010-3 of IC device 1000. Entropy circuitry 1004 may represent one or more bit generator circuits (e.g., bit generator circuits 108 in FIG. 1), and an output 1006 may represent one or more of the n-bits 112 in FIG. 1.

Alternatively, entropy circuitry 1004 may represent a portion of a splintered bit generator circuit, output 1006 may represent an output of the portion of the splintered bit generator circuit, and an input 1008 may represent an input to the portion of the splintered bit generator circuit. As an example, entropy circuitry 1004 may represent oscillator 210A in FIG. 2, and output 1006 may represent clock 212A. As another example, entropy circuitry 1004 may represent one or more inverting delay elements of a ring oscillator (e.g., inverting delay cell 302-1 in FIG. 3), or a portion of an inverting delay element. As another example, entropy circuitry 1004 may represent contention-based entropy circuit 814 in FIG. 8, one of cross-coupled inverters 806 and 808, or a portion thereof.

In FIG. 10, circuitry 1001 further includes splintered power supply circuitry that is distributed amongst dies 1010-1 and 1010-2 of IC device 1000. The power supply circuitry includes a Vbias P circuit 1012 that controls/sources a current ip to entropy circuitry 1004 based on a voltage Vx (i.e., a voltage-controlled current source). The power supply circuitry further includes a P bias circuit 1014 that controls voltage Vx. P bias circuit 1014 may include a resistor, for example, which may serve as an additional source of entropy. The resistor and/or other components may be selected based on design specifications of Vbias P circuit 1012, entropy circuitry 1004, and/or other factors.

Through-die connections (e.g., a wire 1022) and/or through-silicon vias (TSVs) 1020 may provide additional sources of entropy (e.g., due to inherent resistance and/or parasitic capacitance). In the example of FIG. 10, Vbias P circuit 1012 is placed in an upper-most or top die of IC device 1000, which may be useful to disable entropy circuity 1004 in the event of delayering.

Figure 11:
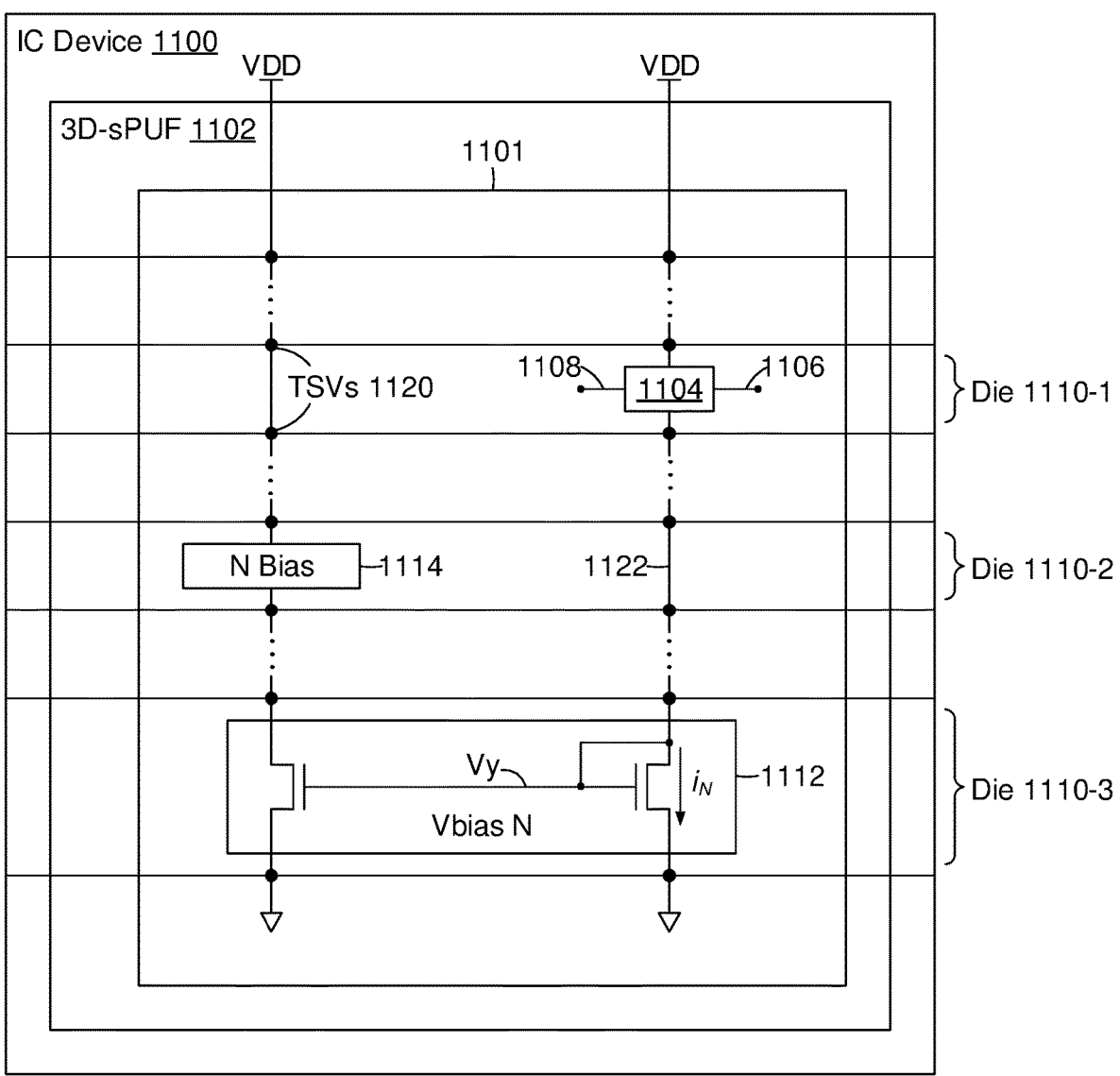
FIG. 11 is another schematic diagram of circuitry of a 3D-sPUF circuit, distributed amongst multiple dies of an IC device, according to an embodiment.

FIG. 11 is a schematic diagram of circuitry 1101 of a 3D-sPUF circuit 1102, distributed amongst multiple dies of an IC device 1000, according to an embodiment. In the example of FIG. 11, circuitry 1101 includes entropy circuitry 1104 placed on a die 1110-1 of IC device 1000, such as described above with respect to entropy circuitry 1004 in FIG. 10. Circuitry 1101 further includes splintered power supply circuitry that is distributed amongst dies 1110-2 and 1110-3 of IC device 1000. The power supply circuitry includes a Vbias N circuit 1112 that controls/sinks a current in from entropy circuitry 1104 based on a voltage Vy. The power supply circuitry further includes an N bias circuit 1114 that controls voltage Vy. N bias circuit 1114 may include a resistor, for example, which may serve as an additional source of entropy. Through-die connections (e.g., a wire 1122) and/or through-silicon vias (TSVs) 1120 may provide additional sources of entropy. In the example of FIG. 11, Vbias N circuit 1112 is placed in a base die 1110-3 of IC device 1100, which may be useful to disable entropy circuity 1104 in the event of delayering.

Figure 12:
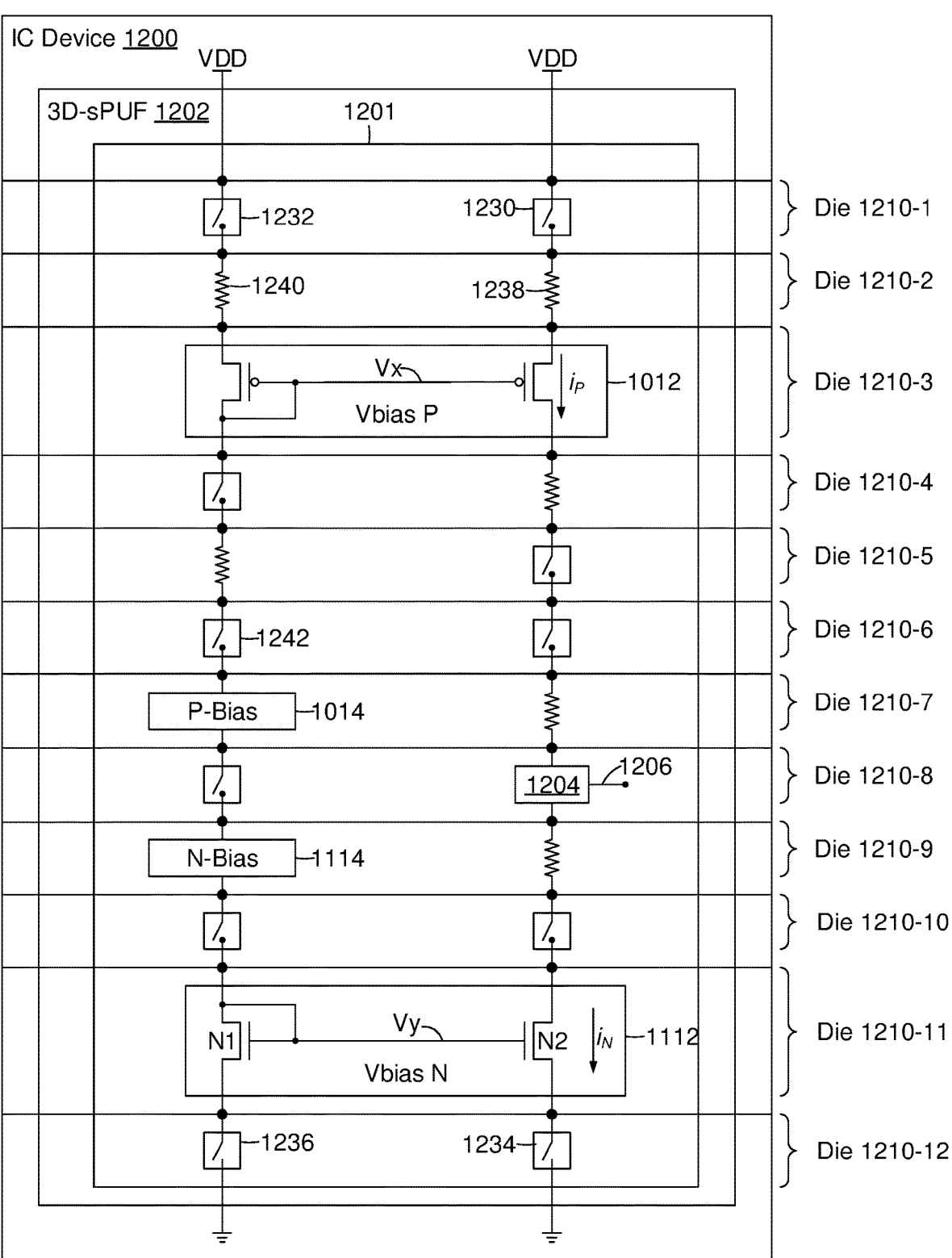
FIG. 12 is another schematic diagram of circuitry of a 3D-sPUF circuit, distributed amongst multiple dies of an IC device, according to an embodiment.

FIG. 12 is a schematic diagram of circuitry 1201 of a 3D-sPUF circuit 1202, distributed amongst multiple dies 1210-1 through 1210-12 of an IC device 1200, according to an embodiment. In the example of FIG. 12, circuitry 1201 includes entropy circuitry 1204 placed on a die 1210-8 of IC device 1200, such as described above with respect to entropy circuitry 1004 in FIG. 10.

Circuitry 1201 further includes splintered power supply circuitry that is distributed amongst multiple dies of IC device 1200. The splintered power supply circuitry includes Vbias P circuit 1012 and P bias circuit 1014 of FIG. 10, and Vbias N circuit 1112 and N bias circuit 1114 of FIG. 11. The splintered power supply circuitry further includes resistors (e.g., resistors 1238 and 1240), which may be useful to reduce VDD to a desired voltage of a die or circuit, rather than providing multiple voltages to an IC device, and which may serve as additional sources of entropy and/or security (e.g., with respect to delayering).

In the example of FIG. 12, circuitry 1201 further includes switches (e.g., switches 1230, 1232, 1234, 1236, and 1242). Switches may be useful disable circuitry 1201, or a portion (s) thereof (e.g., to conserve power and/or to slow ageing of transistors of circuitry 1201). Circuitry 1201, or a portion(s) thereof, may be disabled after bit generation, and/or if entropy circuitry 1204 is associated with un-selected bit generator circuit. The switches may serve as additional sources of entropy. In an embodiment, a normally-open switch is placed in an intermediate die (e.g., switch 1242), and switch enable logic is placed in top die 1210-1 and/or base die 1210-12. This may be useful for security purposes in that, delayering will disable the switch control/enable logic, which will disable or disrupt circuitry 1201, or a portion thereof.

In the example of FIG. 12, entropy circuitry 1204, Vbias P circuit 1012, P bias circuit 1014, Vbias N circuit 1112, and N bias circuit 1214 are placed in internal dies of IC device 1200, rather than top die 1210-1 or base die 1210-12. This may be useful to isolate the respective circuitry from noise of top die 1210-1 and/or base die 1210-12. Switches 1230 and 1232 in top die 1210-1, and switches 1234 and 1236 in base die 1210-12, may enhance security (e.g., with respect to delayering).

In the examples of FIGS. 10, 11, and 12, circuitry 1001, 1101, and 1201 include two paths between VDD and ground. In another example, a single path may be provided, or more than two paths may be provided. For example, in FIG. 12, circuitry 1201 may include a third path between VDD and ground, and N bias circuit 1214 and/or a transistor N1 of Vbias N circuit 1112 may be moved to the third path. Other splintering and distribution variations may also be employed.

Figure 13:
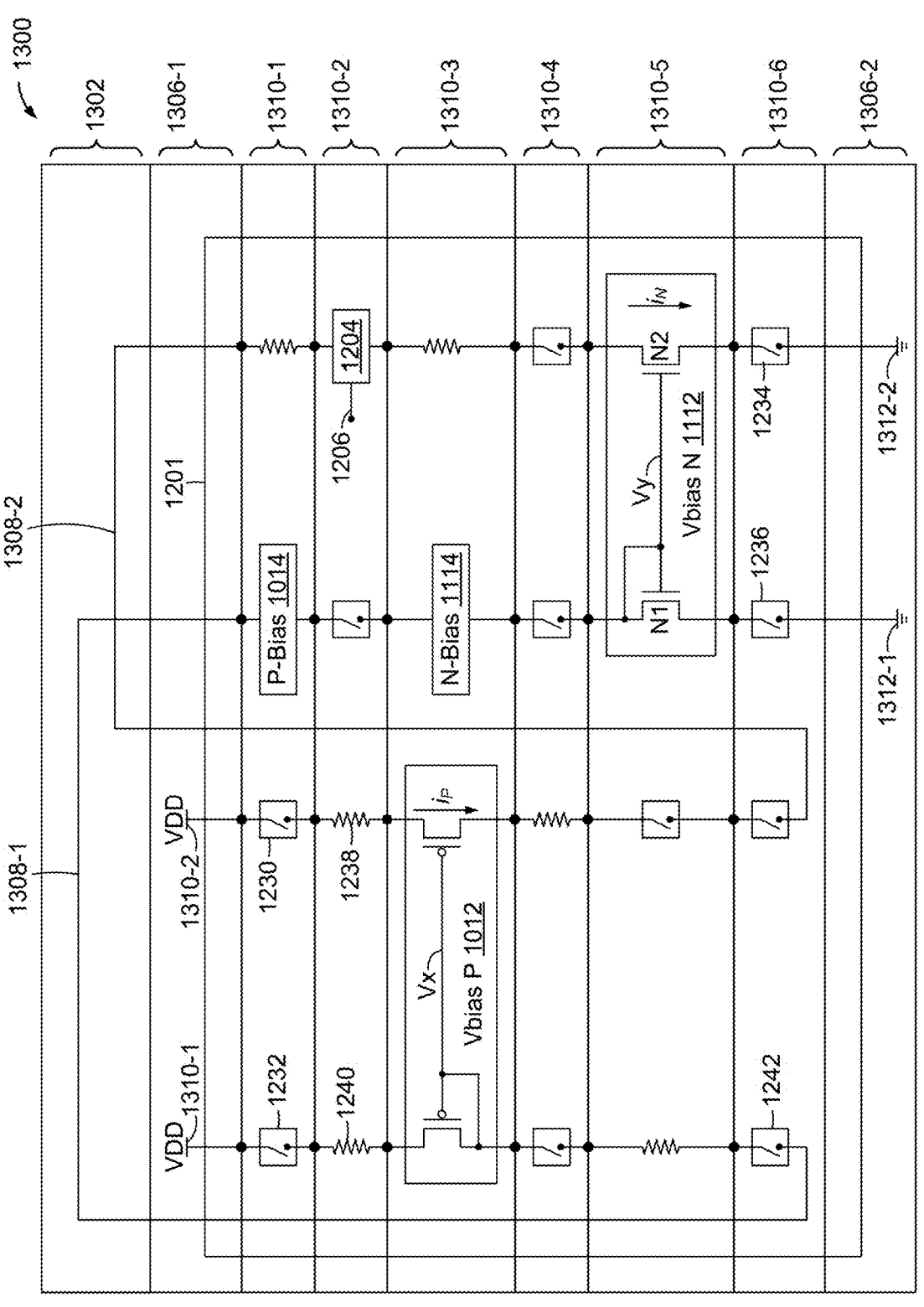
FIG. 13 is a schematic diagram of an IC device, according to an embodiment.

FIG. 13 is a schematic diagram of an IC device 1300, according to an embodiment. IC device 1300 includes circuitry 1201 of 3D-sPUF circuit 1202, distributed amongst multiple dies 1310-1 through 1310-6. In the example of FIG. 13, dies 1310-1 through 1310-6 are positioned between metal layers 1306-1 and 1306-2. Metal layer 1306-1 and/or metal layer 1306-2 may represent multiple metal layers. Further in FIG. 3, 3D-sPUF circuit 1201 includes a first power supply path 1308-1 between a voltage source VDD 1310-1 of metal layer 1306-1 and a reference voltage VSS 1312-1 (e.g., ground) of metal layer 1306-2. 3D-sPUF circuit 1201 further includes a second power supply path 1308-2 between a voltage source VDD 1310-2 of metal layer 1306-1 and a reference voltage VSS 1312-2 of metal layer 1306-2. Voltage sources VDD 1310-1 and 1310-2 may represent taps of the same voltage source. Reference voltages VSS 1312-1 and 1312-2 may represent taps of the same reference voltage.

IC device 1300 further includes a shielding layer 1302 positioned adjacent to metal layer 1306-1. Shielding layer 1302 may be opaque (i.e., non-transmissive) to electromagnetic radiation, which may be useful to prevent external monitoring and/or reverse engineering of 3D-sPUF circuit 1202. In the example of FIG. 3, shielding layer 1302 includes a portion of first and second power supply paths 1308-1 and 1308-2, which may be useful to disable circuitry 1201 in the event that shielding layer 1302 is removed or tampered with. Additional portions of power supply path 1308-1 and power supply path 1308-2 may be routed through shielding layer 1302. In an example, shielding layer 1302 is devoid of active electrical components. In the example of FIG. 13, circuit 1201 is essentially separated into two columns that are connected through shielding layer 1302. In other examples, circuit 1201 (and/or other 3D-sPUF circuitry), may be separated into two or more columns that are connected through one or more shielding layers.

Alternatively, or additionally, a similar shielding layer may be positioned adjacent to metal layer 1306 (opposite die 1210-6), and portions of power supply path 1308-1 and/or power supply 1308-2 may be routed through the similar shielding layer.

FIG. 14 illustrates a method 1400 of configuring and using a 3D-sPUF circuit, according to an embodiment. Method 1400 is described below with respect to examples presented above, and with respect to an embodiment in which 3D-sPUF circuit 102 includes q bit generator circuits, where q is greater than n. Method 1400 is not, however, limited to the foregoing examples.

At 1402, a system (e.g., a test/programming system) cycles power to IC device 100 to cause the q bit generator circuits of 3D-sPUF circuit 102 to generate bit values. The test device also captures the generated bit values.

At 1404, the system captures the generated bit values.

At 1406, the system selects a subset of n of the q bit generator circuits to serve as bit generator circuits 108, based on stabilities of the bit values generated by the respective bit generator circuits.

At 1408, the system configures IC device 100 and/or 3D-sPUF circuit 102 (e.g., configures programmable logic of IC device 100 and/or 3D-sPUF circuit 102) to use the selected n bit generator circuits 108 to generate the set of n-bits 112. The test device may further configure IC device 100 to disable unselected ones of the q bit generator circuits.

At 1410, IC device 100 is powered up (e.g., for use in an intended operating state/application), which causes 3D-sPUF circuit 102 to generate the set of n-bits 112.

At 1412, digital processing circuitry 114 converts the set of n-bits 112 to m-bit key 104.

Figure 15:
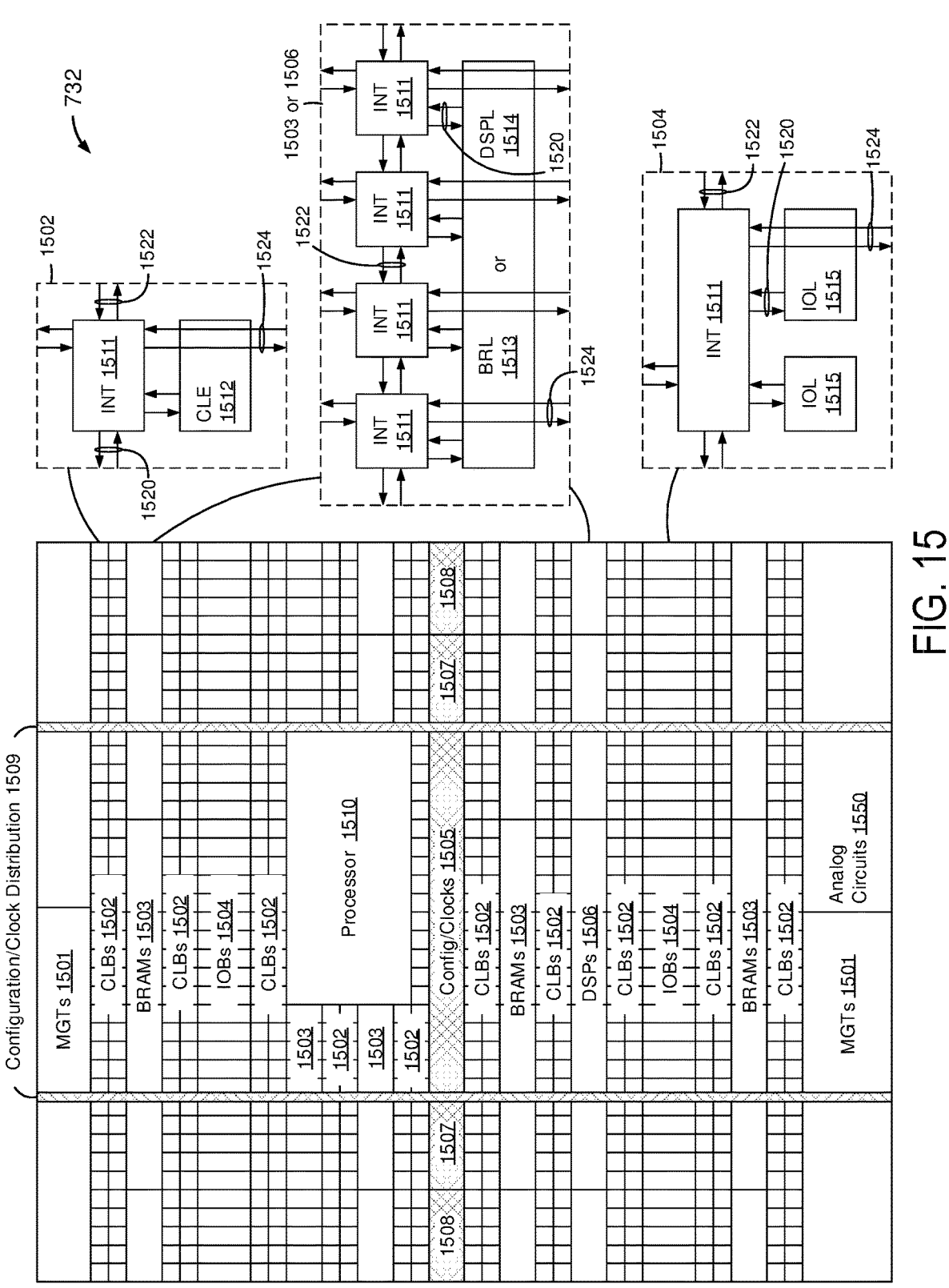
FIG. 15 is a block diagram of configurable circuitry, including an array of configurable or programmable circuit blocks or tiles, according to an embodiment.

IC device 100 and/or 3D-sPUF circuit 102, may include one or more of a variety of types of configurable circuit blocks, such as described below with reference to FIG. 15. FIG. 15 is a block diagram of configurable circuitry 1500, including an array of configurable or programmable circuit blocks or tiles, according to an embodiment. The example of FIG. 15 may represent a field programmable gate array (FPGA) and/or other IC device(s) that utilizes configurable interconnect structures for selectively coupling circuitry/logic elements, such as complex programmable logic devices (CPLDs).

In the example of FIG. 15, the tiles include multi-gigabit transceivers (MGTs) 1501, configurable logic blocks (CLBs) 1502, block random access memory (BRAM) 1503, input/output blocks (IOBs) 1504, configuration and clocking logic (Config/Clocks) 1505, digital signal processing (DSP) blocks 1506, specialized input/output blocks (I/O) 1507 (e.g., configuration ports and clock ports), and other programmable logic 1508, which may include, without limitation, digital clock managers, analog-to-digital converters, and/or system monitoring logic. The tiles further includes a dedicated processor 1510.

One or more tiles may include a programmable interconnect element (INT) 1511 having connections to input and output terminals 1520 of a programmable logic element within the same tile and/or to one or more other tiles. A programmable INT 1511 may include connections to interconnect segments 1522 of another programmable INT 1511 in the same tile and/or another tile(s). A programmable INT 1511 may include connections to interconnect segments 1524 of general routing resources between logic blocks (not shown). The general routing resources may include routing channels between logic blocks (not shown) including tracks of interconnect segments (e.g., interconnect segments 1524) and switch blocks (not shown) for connecting interconnect segments. Interconnect segments of general routing resources (e.g., interconnect segments 1524) may span one or more logic blocks. Programmable INTs 1511, in combination with general routing resources, may represent a programmable interconnect structure.

A CLB 1502 may include a configurable logic element (CLE) 1512 that can be programmed to implement user logic. A CLB 1502 may also include a programmable INT 1511.

A BRAM 1503 may include a BRAM logic element (BRL) 1513 and one or more programmable INTs 1511. A number of interconnect elements included in a tile may depends on a height of the tile. A BRAM 1503 may, for example, have a height of five CLBs 1502. Other numbers (e.g., four) may also be used.

A DSP block 1506 may include a DSP logic element (DSPL) 1514 in addition to one or more programmable INTs 1511. An IOB 1504 may include, for example, two instances of an input/output logic element (IOL) 1515 in addition to one or more instances of a programmable INT 1511. An I/O pad connected to, for example, an I/O logic element 1515, is not necessarily confined to an area of the I/O logic element 1515.

In the example of FIG. 15, config/clocks 1505 may be used for configuration, clock, and/or other control logic. Vertical columns 1509 may be used to distribute clocks and/or configuration signals.

A logic block (e.g., programmable of fixed-function) may disrupt a columnar structure of configurable circuitry 1500. For example, processor 1510 spans several columns of CLBs 1502 and BRAMs 1503. Processor 1510 may include one or more of a variety of components such as, without limitation, a single microprocessor to a complete programmable processing system of microprocessor(s), memory controllers, and/or peripherals.

In FIG. 15, configurable circuitry 1500 further includes analog circuits 1550, which may include, without limitation, one or more analog switches, multiplexers, and/or de-multiplexers. Analog switches may be useful to reduce leakage current.

FIG. 15 is provided for illustrative purposes. Configurable circuitry 1500 is not limited to numbers of logic blocks in a row, relative widths of the rows, numbers and orderings of rows, types of logic blocks included in the rows, relative sizes of the logic blocks, illustrated interconnect/logic implementations, or other example features of FIG. 15.

In the preceding, reference is made to embodiments presented in this disclosure. However, the scope of the present disclosure is not limited to specific described embodiments. Instead, any combination of the described features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various examples of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to specific examples, other and further examples may be devised without departing from the basic scope thereof, and the scope thereof is determined by the claims that follow.

What is claimed is:

1. An integrated circuit (IC) device, comprising:
   a first metal layer comprising first and second power supply nodes;
   a second metal layer comprising first and second ground nodes;
   multiple dies in a stacked configuration, disposed between first and second metal layers; and
   a physical unclonable function (PUF) circuit configured to generate a set of bits that is unique to the IC device based on physical variations of elements of the PUF circuit;
   wherein the PUF circuit is distributed amongst two or more of the dies; and
   wherein the PUF circuit comprises power supply circuitry that comprises:
       a first power supply path between the first power supply node and the first ground node and through the multiple dies; and
       a second power supply path between the second power supply node and the second ground node and through the multiple dies.

2. The IC device of claim 1, wherein:
   the PUF circuit further comprises bit generator circuitry configured to generate the set of bits based on the physical variations of elements of the PUF circuit, including physical variations of elements of the bit generator circuitry;
   the power supply circuitry is configured to provide power to the bit generator circuitry; and
   one or more of the bit generator circuitry and the power supply circuitry is distributed amongst the two or more dies.

3. The IC device of claim 2, wherein the bit generator circuitry is disposed in one of the dies, and wherein the power supply circuitry is distributed amongst the two or more dies.

4. The IC device of claim 2, wherein the bit generator circuitry is distributed amongst the two or more dies.

5. The IC device of claim 2, wherein the bit generator circuitry is configured to generate the set of bits based further on a physical variation of an element of the power supply circuitry.

6. The IC device of claim 5, wherein:
   the power supply circuitry comprises a path through two or more of the dies;
   the path comprises one or more resistors; and
   the bit generator circuitry is configured to generate the set of bits based further on a physical variation of the one or more resistors.

7. The IC device of claim 2, wherein:

the power supply circuitry further comprises a resistor in the first power supply path configured to reduce a voltage of the first power supply node, and a current bias circuit configured to control a current of the second power supply path based on the reduced voltage of the first power supply node;

the resistor and the current bias circuit are disposed in different ones of the dies; and the bit generator circuitry is configured to generate the set of bits based further on a physical variation of the resistor.

8. The IC device of claim 7, wherein the current bias circuit is disposed in one of:

a first one of the dies adjacent to the first metal layer; and a second one of the dies adjacent to the second metal layer.

9. The IC device of claim 7, wherein:

the current bias circuit is disposed in an intermediate one of the dies that is positioned between a first one of the dies adjacent to the first metal layer, and a second one of the dies adjacent to the second metal layer;

one or more of the first and second paths further comprises a switch; and one or more of the first die and the second die comprises circuitry configured to control the switch.

10. The IC device of claim 2, wherein:

the power supply circuitry comprises a path through the dies;

the path comprises a switch disposed in an intermediate one of dies positioned between a top one of the dies and a base one of the dies; and one or more of the top die and the base die comprises circuitry configured to control the switch.

11. The IC device of claim 2, wherein:

the dies comprise a first set of one or more dies fabricated based on a first fabrication process, and a second set of one or more dies fabricated based on a second fabrication process that differs from the first fabrication process; and the bit generator circuitry is disposed in one or more dies of the first set of one or more dies; and the power supply circuitry is distributed amongst the first and second sets of dies.

12. The IC device of claim 2, wherein:

the bit generator circuitry comprises a set of bit generator circuits; and the bit generator circuitry is configured to use a selectable subset of the set of bit generator circuits to generate the set of bits.

13. The IC device of claim 2, wherein:

the multiple dies are disposed between first and second metal layers;

the power supply circuitry comprises first and second power supply paths between a voltage supply of the first metal layer and a reference voltage the second metal layer;

the IC device further comprises a shielding layer, wherein one of the first and second metal layers is disposed between the shielding layer and the dies; and the shielding layer comprises a portion of one or more of the first and second power supply paths.

14. The IC device of claim 1, wherein:

the power supply circuitry comprises a path that extends through two or more of the dies;

the path comprises metal-filled vias of dielectric layers positioned between adjacent ones of the two or more dies; and the sources of entropy further comprise physical variations of the metal-filled vias.

15. A system, comprising:

a first device comprising an integrated circuit (IC) device, wherein the IC device comprises:

a first metal layer comprising first and second power supply nodes;

a second metal layer comprising first and second ground nodes;

multiple dies in a stacked configuration, disposed between first and second metal layers;

a physical unclonable function (PUF) circuit configured to generate a set of bits that is unique to the IC device based on physical variations of elements of the PUF circuit, wherein:

the PUF circuit is distributed amongst two or more of the dies;

the PUF circuit comprises power supply circuitry that comprises:

a first power supply path between the first power supply node and the first ground node and through the multiple dies; and a second power supply path between the second power supply node and the second ground node and through the multiple dies; and digital processing circuitry configured to generate a multi-bit key based on the set of bits; and a second device, external of the first device, configured to perform one or more of:

authenticate the first device based on the multi-bit key;

generate an encryption key based on the multi-bit key; and encrypt data based on the multi-bit key.

16. The system of claim 15, wherein:

the PUF circuit further comprises: bit generator circuitry configured to generate the set of bits based on the physical variations of the elements of the PUF circuit;

the power supply circuitry is configured to provide power to the bit generator circuitry; and one or more of the bit generator circuitry and the power supply circuitry is distributed amongst the two or more dies.

17. The system of claim 16, wherein the bit generator circuitry is configured to generate the set of bits based further on a physical variation of an element of the power supply circuitry.

18. The system of claim 17, wherein:

the power supply circuitry further comprises a resistor in the first power supply path configured to reduce a voltage of the first power supply node, and a current bias circuit configured to control a current of the second power supply path based on the reduced voltage of the first power supply node;

the resistor and the current bias circuit are disposed in different ones of the dies; and the bit generator circuitry is configured to generate the set of bits based further on a physical variation of the resistor.

19. An apparatus, comprising:

a processor and a memory comprising instructions to cause the processor to;

apply power to an integrated circuit (IC) device that comprises multiple dies in a stacked configuration and a physical unclonable function (PUF) circuit that comprises multiple bit generator circuits configured to generate respective bit values based on physical variations of elements of the PUF circuit, wherein the PUF circuit is distributed amongst two or more of the dies;

capture the bit values generated by the bit generator circuits;

select a subset of the bit generator circuits based on stabilities of the captured bit values; and configure the PUF circuit to use the selected subset of bit generator circuits to generate a set of bit values when power is subsequently applied to the IC device.

20. The apparatus of claim 19, wherein:

the PUF circuit further comprises power supply circuitry configured to provide power to the bit generator circuits; and the bit generator circuits are configured to generate the respective bit values based further on a physical variation of an element of the power supply circuitry.

* * * * *